US012675855B2

(12) United States Patent (10) Patent No.: US 12,675,855 B2
Jia et al. (45) Date of Patent: Jul. 7, 2026

(54) ONLINE CALIBRATION OF A HEAD-WORN DEVICE

(71) Applicant: Google LLC, Mountain View, CA (US)

(72) Inventors: Zhiheng Jia, Sunnyvale, CA (US); Chao Guo, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/109,909

(22) PCT Filed: Sep. 13, 2023

(86) PCT No.: PCT/US2023/074093
§ 371 (c)(1),
(2) Date: Mar. 7, 2025

(87) PCT Pub. No.: WO2024/059648
PCT Pub. Date: Mar. 21, 2024

(65) Prior Publication Data
US 2026/0010989 A1 Jan. 8, 2026

Related U.S. Application Data

(60) Provisional application No. 63/375,484, filed on Sep. 13, 2022.

(51) Int. Cl.
*G06F 3/01* (2006.01)
*G06T 5/80* (2024.01)
(Continued)

(52) U.S. Cl.
CPC ................ *G06T 5/80* (2024.01); *G06F 3/013* (2013.01); *G06T 7/80* (2017.01); *G06V 40/193* (2022.01);
(Continued)

(58) Field of Classification Search
CPC ... G06T 5/80; G06T 7/80; G06T 2207/30201; G06T 2207/30204; G06F 3/013; G06V 40/193
See application file for complete search history.

(56) References Cited

U.S. PATENT DOCUMENTS

| | | | |
|---|---|---|---|
| 10,839,557 B1 | 11/2020 | Arora et al. | |
| 11,729,373 B1 * | 8/2023 | Shah ..................... | H04N 17/002 348/189 |

(Continued)

OTHER PUBLICATIONS

International Search Report and Written Opinion for PCT Application No. PCT/US2023/074093, mailed on Jan. 8, 2024, 13 pages.

*Primary Examiner* — Premal R Patel
(74) *Attorney, Agent, or Firm* — Brake Hughes Bellermann LLP

(57) ABSTRACT

A head-worn device may be configured with a curved window-element that can generate distortion in images captured by a camera of the head-worn device. Window extrinsics describing the shape, orientation, and/or position of the curved window-element may be used as a calibration to reduce the distortion. An online calibration process may be run at times during use so that the window extrinsics can be updated to accurately represent the curved window-element after changes in the shape, orientation, and/or position of the curved window-element occur.

19 Claims, 5 Drawing Sheets

(51) Int. Cl.
G06T 7/80 (2017.01)
G06V 40/18 (2022.01)

(52) U.S. Cl.
CPC .............. *G06T 2207/30201* (2013.01); *G06T 2207/30204* (2013.01)

(56) References Cited

U.S. PATENT DOCUMENTS

| | | | | |
|---|---|---|---|---|
| 2016/0037144 A1* | 2/2016 | Schultz | ............... | H04N 9/3185 |
| | | | | 348/745 |
| 2020/0209628 A1* | 7/2020 | Sztuk | ................ | G02B 27/0176 |
| 2023/0417987 A1* | 12/2023 | Morgan | .............. | G02B 6/3636 |
| 2024/0411218 A1* | 12/2024 | Moore | .................. | G03B 43/00 |

* cited by examiner

ONLINE CALIBRATION OF A HEAD-WORN DEVICE

CROSS-REFERENCE TO RELATED APPLICATIONS

This application is a 35 U.S.C. § 371 National Phase Entry Application from PCT/US2023/074093, filed on Sep. 13, 2023, entitled "ONLINE CALIBRATION OF A HEAD-WORN DEVICE", which claims the benefit of U.S. Provisional Application No. 63/375,484, filed on Sep. 13, 2022, entitled "ONLINE CALIBRATION OF A HEAD-WORN DEVICE", the disclosures of which is are incorporated by reference herein in their entirety.

FIELD OF THE DISCLOSURE

The present disclosure relates to a calibration to reduce distortion in images captured by a camera of a head-worn device having a curved window-element.

BACKGROUND

A head-mounted device (i.e., headset) may be configured to provide a user with a virtual reality (VR) or augmented reality (AR) experience.

SUMMARY

The proposed head-worn device for AR and/or VR (i.e., AR/VR visor) includes a curved cover-window (i.e., curved window-element). A fiducial is on the curved window-element (e.g., marked on the curved window-element), which may not be noticeable (e.g., invisible) to a user but which can be detected in an image of the curved window-element that has been processed according to a fiducial-detection process. The detected fiducial can be compared to an expected fiducial to determine a misalignment. The expected fiducial can be generated and stored during a factory-calibration process (i.e., offline calibration). In a possible implementation, extrinsics of the cover window may be adjusted based on the misalignment to obtain (updated) cover window extrinsics. This adjustment may occur automatically during operation (i.e., online calibration). This online calibration process may help improve an AR/VR function of the head-worn device. For example, the cover window extrinsics may help reduce distortions in distorted-images captured from light that interacts with the curved cover-window. The reduced distortions in the corrected-images can improve performance of an image-based function of the head-worn device, such as eye-tracking.

In some aspects, the techniques described herein relate to a method including: capturing a plurality of images including a curved window-element of a head-worn device; identifying a detected-fiducial in the plurality of images; comparing the detected-fiducial to an expected-fiducial to calculate a misalignment of the curved window-element; generating an updated window-extrinsic based on the misalignment; and storing the updated window-extrinsic in a memory.

In some aspects, the techniques described herein relate to a head-worn device, including: a memory including an expected-fiducial; a curved window-element; a camera configured to capture a plurality of images including the curved window-element; and a processor communicatively coupled to the camera and to the memory, the processor configured by software instructions to: identify a detected-fiducial in the plurality of images; compare the detected-fiducial to the expected-fiducial to calculate a misalignment of the curved window-element; generate an updated window-extrinsic based on the misalignment; and store the updated window-extrinsic in the memory.

Window extrinsics may describe a shape, an orientation, and/or a position of the curved window-element and may be used for a calibration to reduce distortion. Window extrinsics may thus include one or more parameter values being indicative of a shape, an orientation, and/or a position of the curved window-element with respect to a coordinate system of the head worn device. An (online) calibration process may be run at times during use so that the window extrinsics can be updated to accurately represent the curved window-element after changes in shape, orientation, and/or position of the curved window-element have occurred.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
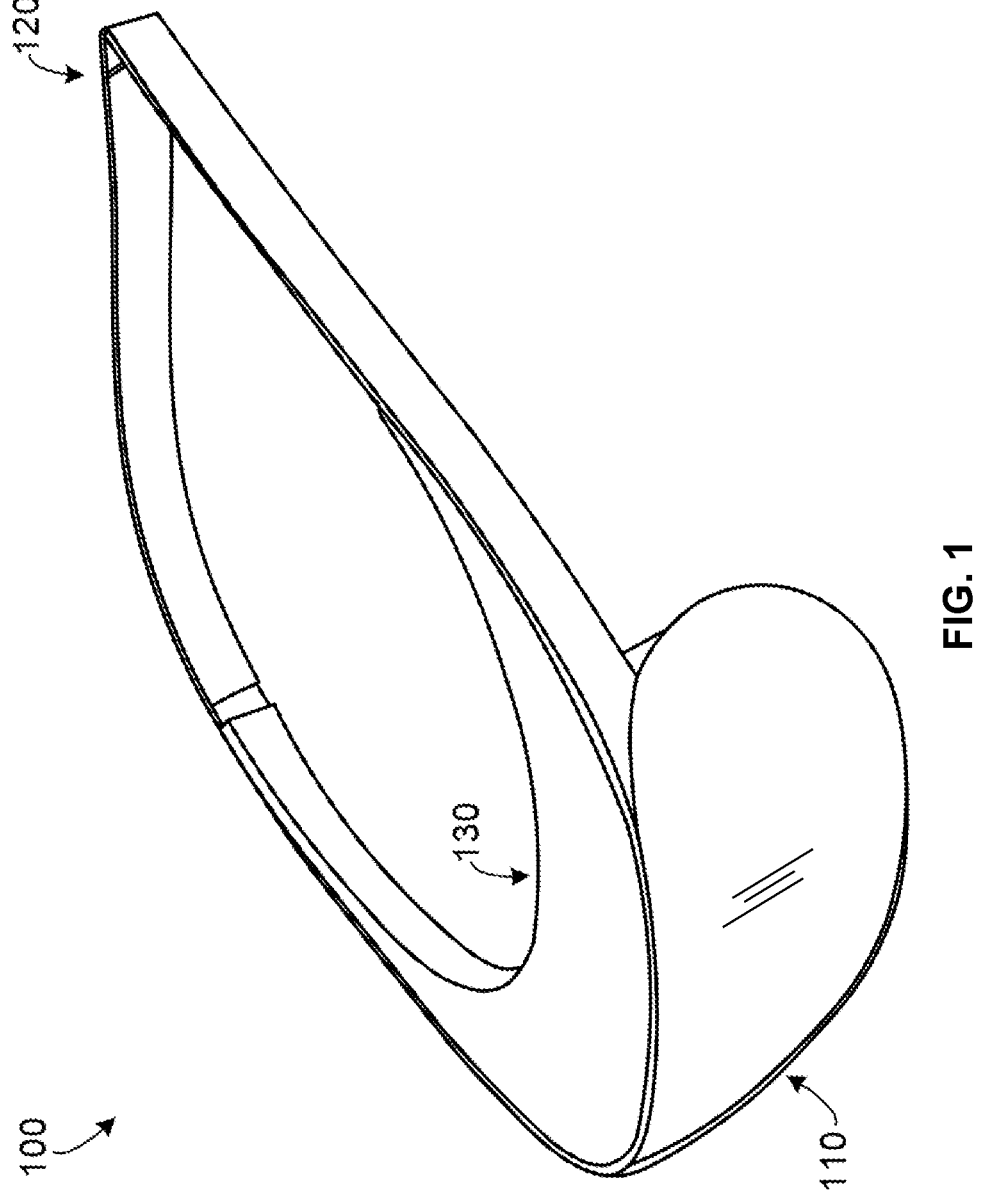
FIG. 1 is a perspective view of a head-worn device illustrating the curved cover window according to a possible implementation of the present disclosure.

It may be desirable, from at least an aesthetics point-of-view, for a head-worn device to have a curved window-element (i.e., curved cover-window) that defines the front-facing surface of the device. The head-worn device may be an AR/VR device that includes a plurality of cameras. For example, the head-worn device may include a plurality of front-facing (i.e., world-facing) cameras (e.g., head-pose camera, hand-tracking camera, pass-through camera) configured to capture images of an environment by imaging light transmitted through the curved window-element. The head-worn device may further include at least one eye-tracking camera configured to capture images of an eye of the user by imaging light reflected from the curved window-element.

While aesthetically pleasing, a curved window-element can generate distortions in images of objects captured by the plurality of cameras. For example, light may be altered (e.g., redirected) as it passes through, or is reflected by, the curved window-element so that a distorted-image is captured. In a distorted-image, aspects of the image do not precisely match aspects (e.g., dimensions) of the object. Accordingly, it may be desirable to reduce, or eliminate, the distortion generated by the curved window-element (i.e., generate a corrected-image) to improve an AR/VR experience.

The distortion caused by the curved window-element may be reduced through a calibration based on one or more of a shape, a position, and an orientation of the curved window-element. In the disclosure the shape, position, and/or orientation of the curved window-element may be included in a set of window-extrinsics, which describes aspects of the curved window-element. Accordingly, in the disclosure, a window-extrinsic, or window-extrinsics, may refer to one or more parameters that describe a shape, an orientation, and/or a position of the curved window element of the head-worn device.

In one possible implementation, a distorted-image captured by a camera receiving light through the curved window-element can be transformed according to the window-extrinsic or window-extrinsics to generate a corrected image that has less distortion than the distorted-image. This correction based on window-extrinsics faces the technical problem of being sensitive to changes in the shape/position/orientation (i.e., pose) of the curved window-element. For example, during a usage, which can include a variety of environments (e.g., thermal conditions) and usages (e.g., damage), the window-extrinsics of the curved window-element can be altered.

Disclosed herein is a head-worn device and method for calibration to correct for (i.e., reduce) distortions generated by the curved window-element. The calibration is referred to as an "online calibration" because the calibration can be automatically adjusted during use of the head-worn device (i.e., while online). Further, the online calibration may proceed without interaction (or knowledge) of a user. The calibration may be a file stored in a memory that includes, or uses, the window-extrinsics and/or values/expressions (e.g., transformation) related to the window-extrinsics to reduce, compensate, or eliminate distortions to images caused by the curved window-element.

The disclosed online calibration is based on determining an expected-fiducial position using a factory-calibration process (i.e., offline calibration), and then, periodically (or as triggered) comparing the expected-fiducial to a detected-fiducial in order to sense and characterize changes to the curved window-element extrinsics (i.e., misalignment). The calibration may then be adjusted or replaced to generate an updated calibration corresponding to the new window-extrinsics (or change in window-extrinsics). In a possible implementation, the window-extrinsics are updated when a misalignment meets a criterion (e.g., is above a threshold), and otherwise not updated.

FIG. 1 is a perspective view of a head-worn device according to a possible implementation of the present disclosure. The head-worn device 100 (i.e., head-mounted device, AR/VR device) is configured to be worn on the head and face of a user. Accordingly, the head-worn device 100 includes a head-engagement portion 120 (e.g., head-strap) configured to mechanically couple the head-worn device to the head of the user. The head-worn device also includes a face-engagement portion 130 that can make contact with a face of the user, especially when the head-engagement portion 120 is in position on the head of the user. The face-engagement portion 130 may encircle the eyes of a user so that the user can view light reflected from, or passed through, a curved window-element 110 of the face-engagement portion 130.

In a possible implementation, the curved window-element 110 may have a radius of curvature in a horizontal direction (e.g., relative to a user) to better match the curvature of the face of the user. An advantage of the calibration approach is that it can accommodate any shape for the curved window-element. Accordingly, the curved window-element 110 may be defined variously and is not limited to any number of curvatures, any combination of curvatures, any direction of curvatures, and/or any orientations of curvatures. For simplicity, however, the disclosure will describe a curved window-element with a radius of curvature.

Figure 2:
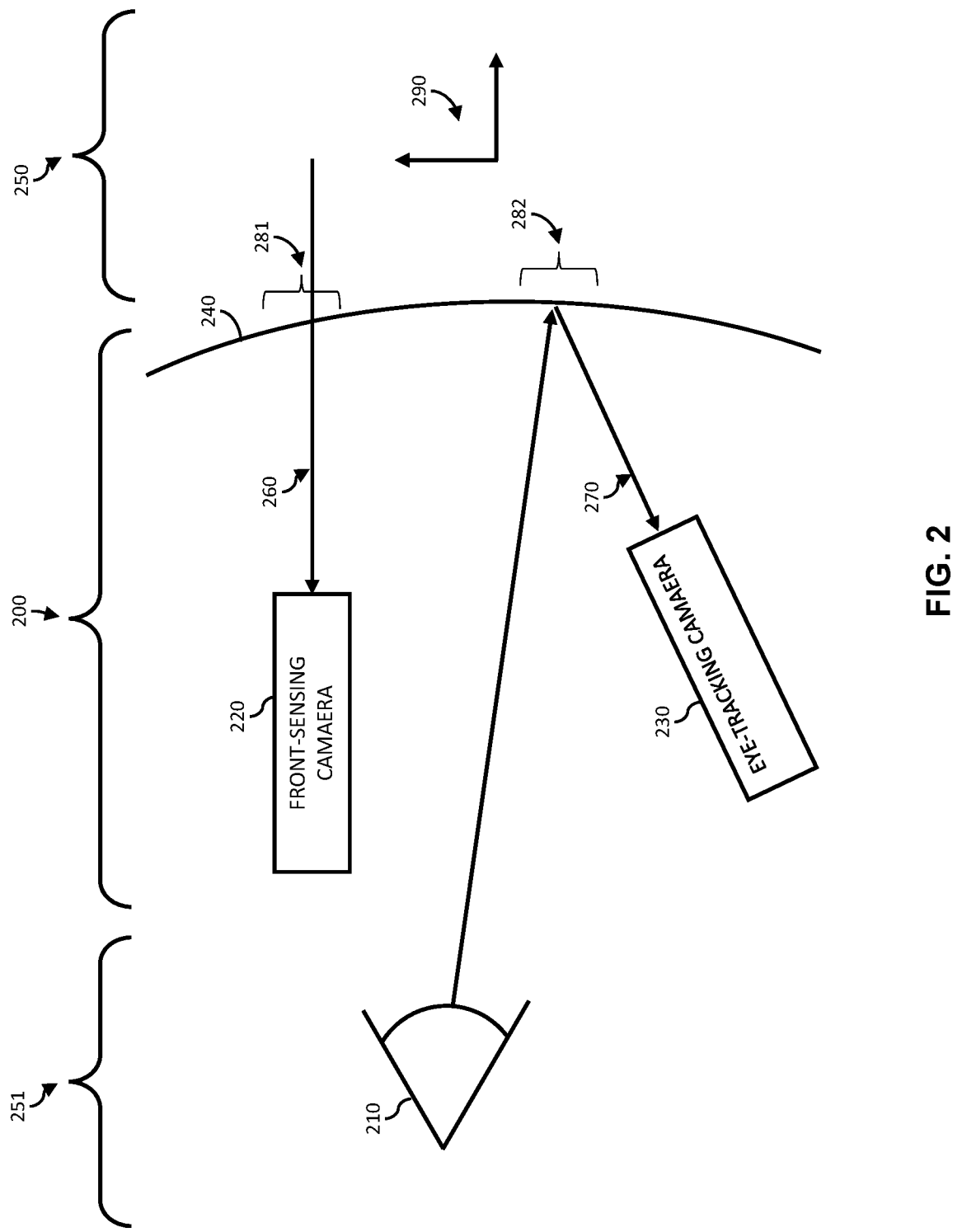
FIG. 2 is a block diagram illustrating some details of the head-worn device according to a possible implementation of the present disclosure.

FIG. 2 is a block diagram illustrating aspects of the head-worn device according to a possible implementation of the present disclosure. The head-worn device 200 includes a curved window-element 240. In a possible implementation, the eye 210 of a user 251 may view an environment 250 through the curved window-element 240. In the disclosure, the environment 250 is considered in front of the curved window-element 240, while the user 251 is considered behind the curved window-element 240). In other words, the user 251 is on an interior side of the curved window-element and the environment 250 is on an exterior side of the curved window-element. So, when it is said that the curved window-element 240 is facing the environment 250 what is meant is that the exterior surface of the curved window-element borders the environment. Further, the curved window-element 240 may be considered as covering the cameras of the head-worn device 200 from the environment 250.

The head-worn device 200 may further include a front-sensing camera 220 configured to capture incident light 260 from the environment 250 through the curved window-element 240. In a possible implementation, a fiducial may present at the curved window-element 240 at a first position 281 so that the front-sensing camera 220 can detect the fiducial. The fiducial may be integrated, in particular marked (e.g., etched, printed, attached) to the curved window-element 240 at the first position 281. For example, the fiducial may be marked on an interior surface or an exterior surface of the curved window-element 240).

The head-worn device 200 may further include an eye-tracking camera 230 that is directed towards the curved window-element 240 and configured to collect reflected light 270 from the eye 210 of the user 251 that is reflected by the curved window-element 240. In a possible implementation, a fiducial may be present at the curved window-element 240 at a second position 282 so that the eye-tracking camera 220 can detect the fiducial. The fiducial may be marked (e.g., etched, printed, attached) to the curved window-element 240. For example, the fiducial may be marked on an interior surface or an exterior surface of the curved window-element 240.

Detecting the fiducial may include determining a position of the fiducial in the field of view of an image captured by a camera (e.g., front-sensing camera 220, eye-tracking camera 230) of the head-worn device. This position may be related to a coordinate system 290 of the head worn device so that the shape/orientation/position of the curved window-element 240 with respect to the coordinate system 290 may be derived and included in window-extrinsics.

A fiducial that is detectable in an image captured by a camera of the head-worn device may not be noticeable to a user. The distance of the fiducial to the eye 210 of the user 251 may reduce its visibility to the user. For example, the fiducial may be located closer to a near point of a user's visual perception so that the eye 210 of the user cannot focus the fiducial on the retina. In other words, the fiducial may be located at a range from the user's eye that prevents the user from focusing a real image of the fiducial on the eye's retina. As a result, light form the fiducial may be blurred on the retina, thereby reducing the user's perception of the fiducial's intensity relative to a background (i.e., the environment).

The size of the fiducial relative to the field of view of the user 251 may also reduce its visibility to the user. As shown in FIG. 2, a field of view of the eye 210 may approximately match the curved window-element 240. The curved window-element may have a dimension (e.g., diameter) that is large compared to a user's field of view (e.g., ≥50 millimeters). Conversely, the fiducial may have a dimension (e.g., diameter) that is small compared to the user's field of view (e.g., ≤1 millimeter). For example, the fiducial may be a fraction (e.g., 1%) of the size of the curved window-element.

The location of the fiducial relative to the field of view of the user may also reduce its visibility to the user. The fiducial may be located close to an edge of the curved window-element so that it is at an edge of the user's field of view.

The blurring of the fiducial, the small size of the fiducial, and/or location of the fiducial at the edge of a user's field of view can prevent the user from easily detecting the fiducial. For example, a user may not notice the fiducial in the same way that a user of glasses (e.g., prescription, reading, sunglasses) may not notice a dust particle on a lens of the glasses. Images captured by a camera (e.g., front-sensing camera 220, eye-tracking camera 230) of the head-worn device 200, however, can be processed to detect the fiducial.

Each fiducial may include one or more markings. The number of markings may correspond to a precision of the window extrinsics. In a possible implementation, a fiducial includes three markings. The markings may be sized, shaped, and arranged to prevent rotational symmetry so that a rotation of the curved window-element 240 can be detected.

Figure 3:
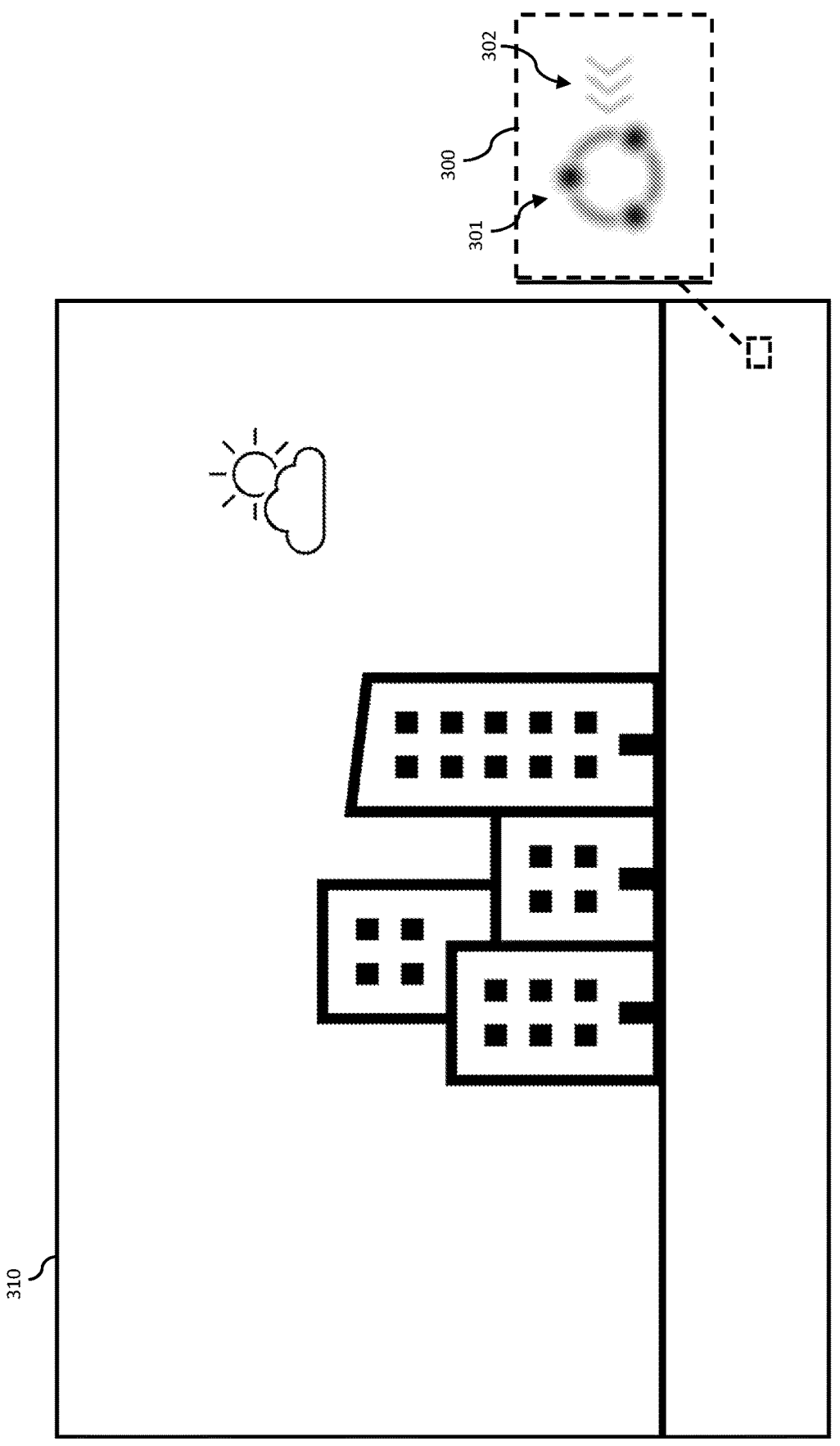
FIG. 3 illustrates an image that includes fiducials according to a possible implementation of the present disclosure.

FIG. 3 illustrates an image 310 that include fiducials according to a possible implementation of the present disclosure. For example, the image 310 may be an image of an environment 250 (i.e., world image) captured by the front-sensing camera 220 of the head-worn device 200. A fiducial image 300 may be generated from the image 310. The fiducial image 300 may include an area (e.g., pixels) of the image 310 corresponding to the first position 281 of the fiducial on the curved window-element 240. The fiducial image 300 includes a first marking 301 and a second marking 302. As shown, the markings are almost imperceptible in the image 310 and may appear to have noise (i.e., blur) in the fiducial image 300. The head-worn device is configured to perform a fiducial detection process to enhance the visibility (e.g., crop, magnify, denoise, etc.) and detect relative position/orientations of the markings in the fiducial image 300 and/or the image 310.

A fiducial-detection process may include capturing a plurality of images including the fiducial. For example, 100 or more images of the fiducial (see FIG. 3) may be captured. The captured images may be averaged to improve a visibility of the fiducial. The pixel locations of the markings of the fiducial may then be determined as a detected fiducial.

A fiducial-calibration process may be performed prior to use (i.e., offline). The fiducial-calibration process may include capturing a plurality of images including the fiducial. For example, 100 or more images with the fiducial (see FIG. 3) may be captured. The captured images may be averaged to improve a visibility of the fiducial. The pixel locations of the markings of the fiducial may then be determined as an expected fiducial. The fiducial-calibration process may be performed at a time of fabrication. At this time, the curved window-element may be in its optimal (factory-set) shape/position/orientation.

Figure 4:
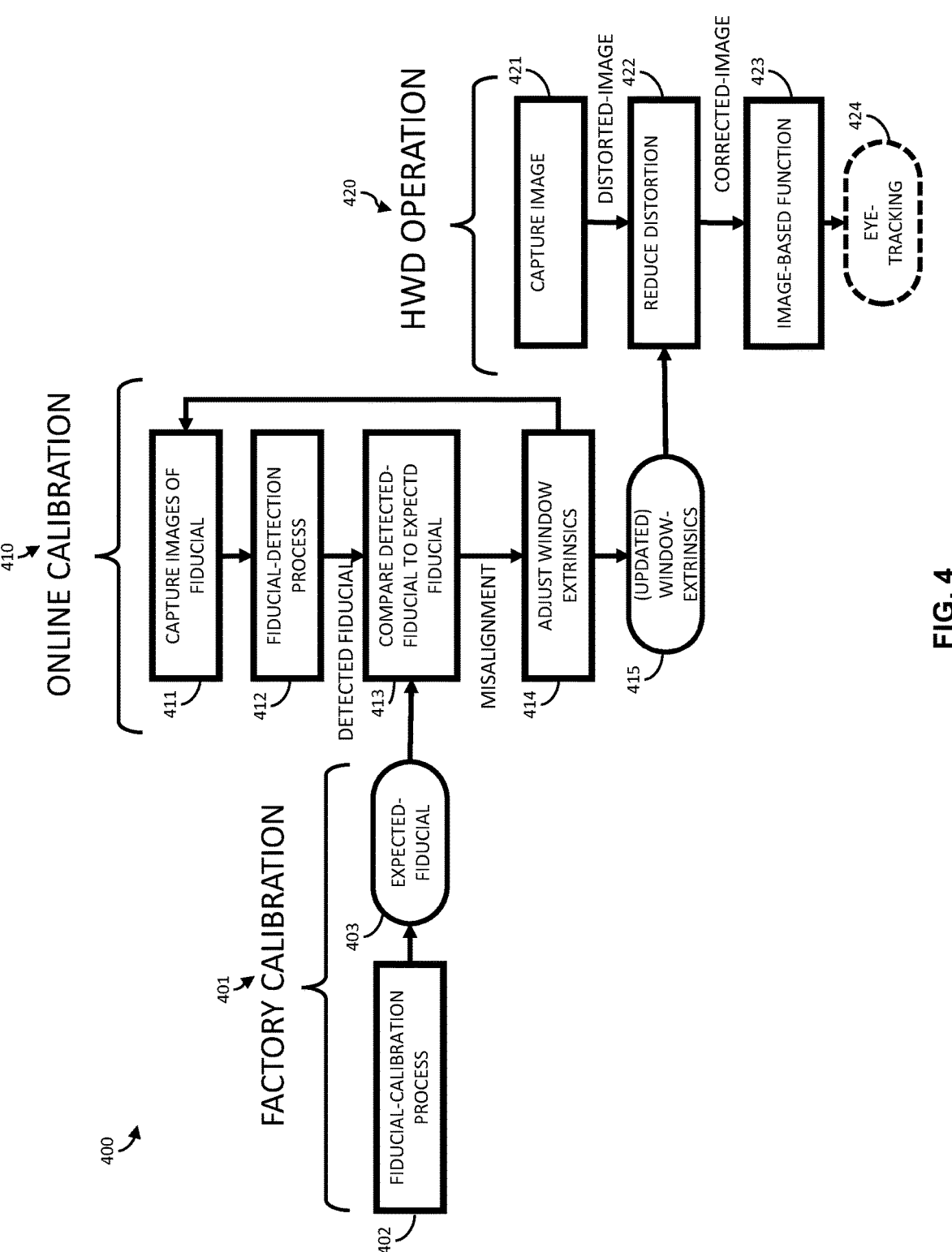
FIG. 4 is a flowchart illustrating the plurality of calibration-related processes of the present disclosure.

FIG. 4 is a flow chart illustrating the plurality of calibration-related processes 400 of the present disclosure. The online calibration process (i.e., online calibration 410) can be performed during use of the head-worn device. In one possible implementation, the online calibration process is performed periodically. In another possible implementation, the online calibration 410 is performed according to a schedule that is not periodic. In another possible implementation, the online calibration 410 is performed on-demand (e.g., user prompted). In another possible implementation, the online calibration 410 is triggered by an event (e.g., shock exceeding a threshold, temperature exceeding a threshold, etc.).

The online calibration 410 uses the results of a factory calibration process (i.e., factory calibration 401), which can be performed prior to use of the head-worn device. For example, the factory calibration 401 may be performed once at a time of fabrication. The results of the factory calibration can be stored in a memory accessible to the head-worn device and recalled as needed by the online calibration 410.

The factory calibration 401 includes a fiducial-calibration process 402 which can include illuminating and imaging a fiducial of the curved window-element to generate at an expected-fiducial 403. The expected-fiducial 403 can include pixel positions of an expected-fiducial (e.g., markers of the expected-fiducial) and/or an expected-fiducial image.

The online calibration 410 includes capturing 411 a plurality of images of the fiducial on the curved window-element. The images (e.g., fiducial images) may be captured in sequence or at different times depending on the use of the head-worn device.

The online calibration 410 further includes applying the images to a fiducial-detection process in order to generate a detected fiducial. The fiducial-detection process 412 may include averaging at least 100 of the plurality of images to increase a visibility of the fiducial in a detected-fiducial image and locating pixel positions of the detected-fiducial (e.g., marker of the detected-fiducial) in the detected-fiducial image. The detected fiducial can include pixel positions of the detected-fiducial (e.g., markers of the expected-fiducial) and/or a detected-fiducial image.

The online calibration 410 further includes comparing 413 the detected fiducial from the fiducial-detection process 412 to the expected-fiducial 403 from the fiducial-calibration process 402 to calculate a misalignment. For example, differences between pixel positions of a detected-fiducial in a detected-fiducial image and pixel position of the expected-fiducial in the expected-fiducial image may be computed and the misalignment may be based on the computed differences.

In a possible implementation, it is determined if the misalignment satisfies a criterion before proceeding with the online calibration process. For example, if the misalignment is greater than a threshold then updated window-extrinsics may be computed and saved, otherwise the window-extrinsics is not updated or replaced.

The online calibration 410 further includes adjusting 414 extrinsics of the curved window-element based on the misalignment to generate updated window-extrinsics 415, which can be stored in a memory of the head-worn device. The extrinsics may include one or more parameters that describe a shape, an orientation, and/or a position of the curved window with respect to a predefined coordinate system of the head worn device, and the one or more parameters can be used for a calibration to reduce distortion when generating an image with the head-worn device.

The results of the online calibration 410 (i.e., the updated window-extrinsics 415) may be recalled from memory by an operating process of the head-worn device (i.e., HWD operation 420). For example, the HWD operation 420 may be performed to facilitate an augmented-reality (AR) or virtual-reality (VR) experience for a user wearing/using the head-worn device.

In a possible implementation, the HWD operation 420 may include capturing 421 a distorted-image of light reflected from, or transmitted through, the curved window-element. The distorted-image includes a distortion generated by the curved window-element. The HWD operation 420 further includes reducing 422 distortion by receiving (e.g., recalling) the updated window-extrinsics from the memory and processing the distorted-image using the updated window-extrinsics 415 to generate a corrected-image, which has less distortion than the distorted image.

The HWD operation 420 may further include performing an image-based function 423 based on the corrected-image. For example, the image-based function can be eye-tracking 424. Tracking an eye 210 of the user 251 can be improved by removing distortions from eye images captured by an eye-tracking camera 230.

Figure 5:
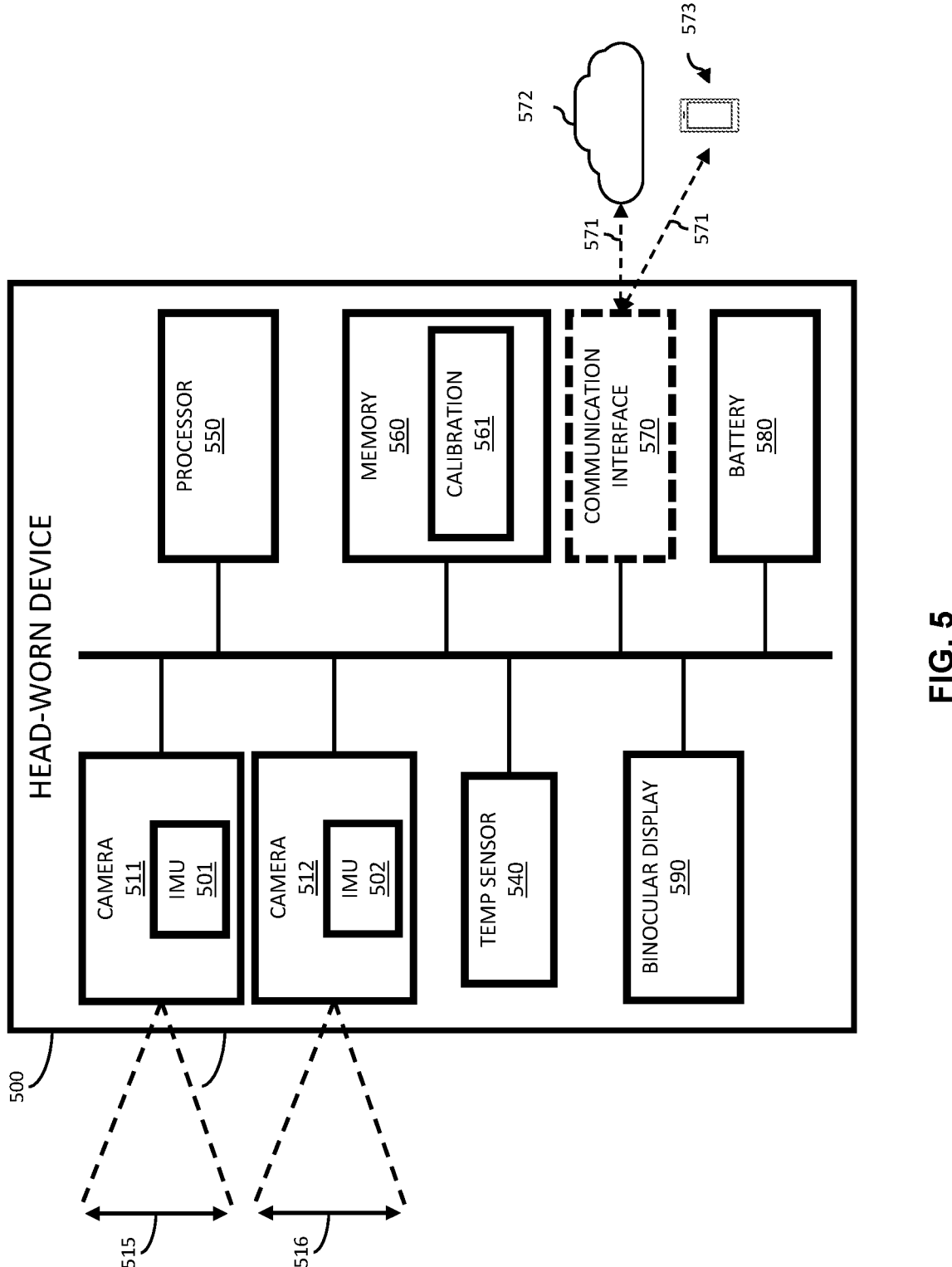
FIG. 5 is a block diagram of a head-worn device according to a possible implementation of the present disclosure.

FIG. 5 is a block diagram of a head-worn device according to a possible implementation of the present disclosure. The head-worn device 500 includes a first camera 511 (e.g., front-sensing camera) configured to capture images of a first field-of-view 515. The head-worn device may further include a processor 550, and images from the first camera 511 may be analyzed by the processor to identify one or more fiducials. Tracking pixel positions of the one or more fiducials over consecutive images may help to determine a window extrinsics of the head-worn device 500. Each camera may have an IMU integrated or otherwise affixed to the camera to measure its position and orientation. For example, the first camera 511 may include a first IMU 501 and the second camera 512 may include a second IMU 502.

The head-worn device 500 further includes a second camera 512 (e.g., eye-tracking camera) configured to capture images of a second field-of-view 516. In a possible implementation, the cameras may be aligned and focused in a stereoscopic pair so that a first image (e.g., right image) of the first field-of-view and a second image (e.g., left image) of the second field-of-view may be combined to form a stereoscopic image (e.g., of the environment).

The head-worn device 500 further includes a memory 560. The memory may be a non-transitory computer-readable medium and may be configured to store instructions that, when executed by the processor 550, can configure the motion tracking device to perform the disclosed methods. For example, the memory 560 may be configured to store a calibration related to a window-extrinsics that can be used to reduce distortion in images captured by the cameras. The head-mounted device may include a temperature sensor 540 configured to measure a temperature corresponding to a temperature of the first IMU 501 and/or a temperature of the second IMU 502. A change in temperature detected by the temperature sensor 540 may be used to trigger an online calibration to update the calibration.

The head-worn device 500 may further include a display (e.g., binocular display 590). In a possible implementation, the display 590 is a heads-up display (i.e., HUD). The head-worn device 500 may further include a battery 580. The battery may be configured to provide energy to the subsystems, modules, and devices of the head-worn device 500 to enable their operation. The battery 580 may be rechargeable and have an operating life (e.g., lifetime) between charges.

The head-worn device 500 may further include a communication interface 570. The communication interface may be configured to communicate information digitally over a wireless communication link 571 (e.g., WiFi, Bluetooth, etc.). For example, the head-worn device may be communicatively coupled to a network 572 (i.e., the cloud) or a device (e.g., mobile phone 573) over the wireless communication link 571. The wireless communication link may allow operations of a computer-implemented method to be divided between devices and/or could allow for remote storage of the calibration 561. In a possible implementation, the head-worn device is an augmented-reality visor. In another possible implementation, the head-worn device is a virtual-reality visor.

In what follows, some example implementations of the disclosure are described.

Example 1

A method (e.g., for calibration) comprising: capturing a plurality of images including a curved window-element of a head-worn device; identifying a detected-fiducial in the plurality of images; comparing the detected-fiducial to an expected-fiducial to calculate a misalignment of the curved window-element; generating an updated window-extrinsic based on the misalignment; and storing the updated window-extrinsic in a memory.

Example 2

The method according to example 1, further including: capturing a distorted-image (e.g., of light reflected from, or transmitted through, the curved window-element) including distortion generated by the curved window-element; receiving the updated window-extrinsic from the memory; and processing the distorted-image using the updated window-extrinsic to reduce the distortion generated by the curved window-element to generate a corrected-image.

Example 3

The method according to example 2, further including: eye-tracking based on the corrected-image.

Example 4

The method according to example 1, wherein identifying the detected-fiducial in the plurality of images includes: averaging the plurality of images to increase a visibility of the detected-fiducial in a detected-fiducial image.

Example 5

The method according to example 4, wherein comparing the detected-fiducial to the expected-fiducial to calculate the misalignment of the curved window-element includes: retrieving an expected-fiducial image from the memory; locating pixel positions of the expected-fiducial in the expected-fiducial image; computing a difference between the pixel positions of the detected-fiducial in the detected-fiducial image and the pixel positions of the expected-fiducial in the expected-fiducial image; and computing the misalignment based on the difference.

Example 6

The method according to example 5, further comprising: capturing the expected-fiducial image offline at a time of fabrication of the head-worn device; and storing the expected-fiducial image in the memory of the head-worn device.

Example 7

The method according to example 1, wherein capturing the plurality of images including the curved window-element of the head-worn device occurs online during a use of the head-worn device.

Example 8

The method according to example 1, wherein generating the updated window-extrinsic is based on a schedule.

Example 9

The method according to example 1, wherein generating the updated window-extrinsic is based on a comparison of the misalignment to a threshold.

Example 10

A non-transitory computer-readable medium storing instructions that, when executed by a processor of the head-worn device configures the head-worn device to perform the method of any one of examples 1 to 9.

Example 11

A head-worn device, comprising: a memory including an expected-fiducial; a curved window-element; a camera configured to capture a plurality of images including the curved window-element; and a processor communicatively coupled to the camera and to the memory, the processor configured by software instructions to: identify a detected-fiducial in the plurality of images; compare the detected-fiducial to the expected-fiducial to calculate a misalignment of the curved window-element; generate an updated window-extrinsic based on the misalignment; and store the updated window-extrinsic in the memory.

Example 12

The head-worn device according to example 11, wherein: the camera is a front-sensing camera configured to detect light transmitted to the front-sensing camera through the curved window-element.

Example 13

The head-worn device according to example 11, wherein: the camera is an eye-tracking camera configured to detect light reflected to the eye-tracking camera by the curved window-element.

Example 14

The head-worn device according to example 13, wherein the processor is further configured by the software instructions to: reduce a distortion in an eye-image captured by the eye-tracking camera based on the updated window-extrinsic.

Example 15

The head-worn device according to example 11, wherein the head-worn device is an augmented-reality visor.

Example 16 the head-worn device according to example 11, wherein the head-worn device is a virtual-reality visor.

Example 17

The head-worn device according to example 11, wherein the curved window-element includes a fiducial etched, printed, or attached to a surface of the curved window-element.

Example 18

The head-worn device according to example 17, wherein the fiducial includes a plurality of markings that are sized differently and arranged to not have a rotational symmetry.

Example 19

The head-worn device according to example 18, wherein each marking of the plurality of markings has a dimension less than 1 millimeter.

Example 20

The head-worn device according to example 17, wherein the fiducial is sized and positioned to reduce a visibility of the fiducial (e.g., to a user).

Example 21

The head-worn device according to example 20, wherein the processor is further configured to: average the plurality of images to increase the visibility of the fiducial in a detected-fiducial image.

Example 22

The head-worn device according to example 11, wherein the updated window-extrinsic includes a position and orientation of the curved window-element relative to a coordinate system of the head-worn device.

All, or part, of the methods described can be performed by a processor configured by software instructions to perform steps of the processes. In some implementations, a tangible computer-readable storage medium may be configured to store instructions that when executed cause a processor to perform a process. The software may be a computer program written in any form of programming language, including compiled or interpreted languages, and may be deployed in any form, including as a standalone program or as a module, component, subroutine, or other unit suitable for use in a computing environment. The computer program may be deployed to be processed on one computer or on multiple computers at one site or distributed across multiple sites and interconnected by a communication network. The computer program may be stored on a non-transitory computer readable memory (i.e., memory) accessible to the head-worn device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A method comprising:
capturing a plurality of images to generate a composite image including a window-element of a head-worn device, the window-element having a curve;
identifying a fiducial in the composite image;
comparing pixel positions of the fiducial in the composite image to pixel positions of an expected-fiducial to calculate a misalignment of the window-element;
updating a calibration parameter based on the misalignment; and
modifying a distorted-image captured through the window-element based on the calibration parameter.

2. The method according to claim 1, wherein modifying the distorted-image includes:
capturing the distorted-image, which includes a distortion generated by the window-element;
receiving the calibration parameter from a memory; and
processing the distorted-image using the calibration parameter to reduce the distortion generated by the window-element to generate a corrected-image, the distortion being reduced in the corrected-image.

3. The method according to claim 2, further including:
determining a position of an eye of the head-worn device based on the corrected-image.

4. The method according to claim 1, wherein generating the composite image includes:
averaging the plurality of images to increase a visibility of the fiducial.

5. The method according to claim 1, wherein comparing the pixel positions of the fiducial in the composite image to the pixel positions of the expected-fiducial to calculate the misalignment of the window-element includes:
retrieving an image of the expected-fiducial from a memory;
locating the pixel positions of the expected-fiducial in the image of the expected-fiducial;
computing a difference between the pixel positions of the fiducial in the composite image and the pixel positions of the expected-fiducial in the image of the expected-fiducial; and
computing the misalignment based on the difference.

6. The method according to claim 5, further comprising:
capturing the image of the expected-fiducial while offline at a time of fabrication of the head-worn device; and
storing the image of the expected-fiducial in the memory.

7. The method according to claim 1, wherein generating the distorted-image including the window-element of the head-worn device occurs online during a use of the head-worn device.

8. The method according to claim 1, wherein updating the calibration parameter is based on a schedule.

9. The method according to claim 1, wherein updating the calibration parameter is based on a comparison of the misalignment to a threshold.

10. A head-worn device, comprising:
a memory including an expected-fiducial;
a window-element;
a camera configured to capture a plurality of images including the window-element; and
a processor communicatively coupled to the camera and to the memory, the processor configured by software instructions to:
generate a composite image based on the plurality of images;
identify a fiducial in the composite image;
compare pixel positions of the fiducial in the composite image to pixel positions of the expected-fiducial to calculate a misalignment of the window-element;
update a calibration parameter based on the misalignment;
store the calibration parameter in the memory; and
modify a distorted-image captured through the window-element based on the calibration parameter.

11. The head-worn device according to claim 10, wherein:
the camera is a front-sensing camera configured to detect light transmitted to the front-sensing camera through the window-element.

12. The head-worn device according to claim 10, wherein:
the camera is an eye camera configured to detect light from an eye reflected to the eye camera by the window-element.

13. The head-worn device according to claim 12, wherein the processor is further configured by the software instructions to:
reduce a distortion in an image of the eye captured by the eye camera based on the calibration parameter.

14. The head-worn device according to claim 10, wherein the head-worn device is an augmented-reality visor.

15. The head-worn device according to claim 10, wherein the head-worn device is a virtual-reality visor.

16. The head-worn device according to claim 10, wherein the window-element includes the fiducial etched, printed, or attached to a surface of the window-element.

17. The head-worn device according to claim 16, wherein the fiducial includes a plurality of markings that are sized differently and arranged to not have a rotational symmetry and each marking of the plurality of markings has a dimension less than 1 millimeter.

18. The head-worn device according to claim 16, wherein the fiducial is sized and positioned so that it cannot be focused by a user of the head-worn device.

19. The head-worn device according to claim 10, wherein the calibration parameter includes a position and orientation of the window-element relative to a coordinate system of the head-worn device.

\* \* \* \* \*